US006535276B2

(12) United States Patent
Dubois

(10) Patent No.: US 6,535,276 B2
(45) Date of Patent: Mar. 18, 2003

(54) METHOD FOR MEASURING THE VELOCITY OF PARTICLES IN A FLUID MEDIUM IN MOTION

(75) Inventor: Frank Dubois, Brussels (BE)

(73) Assignee: Universite Libre de Bruxelles, Brussels (BE)

( * ) Notice: Subject to any disclaimer, the term of this patent is extended or adjusted under 35 U.S.C. 154(b) by 0 days.

(21) Appl. No.: 09/904,955

(22) Filed: Jul. 12, 2001

(65) Prior Publication Data

US 2002/0159047 A1 Oct. 31, 2002

(30) Foreign Application Priority Data

Jul. 14, 2000 (EP) ............................................. 00870165

(51) Int. Cl.$^7$ ............................... G01P 3/36; G03H 1/02
(52) U.S. Cl. ............................... 356/28.5; 356/28; 359/3
(58) Field of Search ....................... 356/28, 28.5; 359/3

(56) References Cited

U.S. PATENT DOCUMENTS

| 3,572,882 A | * | 3/1971 | Neumann |
| 5,018,852 A | * | 5/1991 | Cheng et al. ............... 356/28.5 |
| 5,532,814 A | * | 7/1996 | Cha ........................... 356/28.5 |
| 5,892,602 A | | 4/1999 | Sirat |
| 5,905,568 A | * | 5/1999 | McDowell ................... 356/28 |
| 6,078,392 A | | 6/2000 | Thomas et al. |

FOREIGN PATENT DOCUMENTS

WO    WO 00/19214    4/2000

* cited by examiner

Primary Examiner—Stephen C. Buczinski
(74) Attorney, Agent, or Firm—Knobbe Martens Olson & Bear LLP

(57) ABSTRACT

A method measures the three dimensional position of particles in a fluid medium contained in a sample by recording a digital hologram of the particles on an image sensor and by reconstructing the image of the particles from the hologram. The recording includes providing a source beam with a coherent source, and generating at least two beams from the source beam, namely a reference beam and at least one object beam, wherein the reference beam and the object beam are mutually coherent. The sample is illuminated by condensing the object beam onto the sample in order to obtain a scattered object beam for each particle. The scattered object beam is scattered into a spherical converging object beam toward the image sensor for each particle. Further, the recording includes forming a diverging spherical beam from the reference beam, and superposing the spherical converging object beam for each particle and the diverging spherical beam on the image sensor in order to obtain on the image sensor an hologram of the particles by interfering the beams.

17 Claims, 3 Drawing Sheets

METHOD FOR MEASURING THE VELOCITY OF PARTICLES IN A FLUID MEDIUM IN MOTION

BACKGROUND OF THE INVENTION

1. Field of the Invention

The present invention is related to a method of measuring the three dimensional position of particles, in particular the velocity of particles in motion in a fluid medium.

2. Description of the Related Art

Several techniques to measure the three dimensional position of particles in a fluid, in particular the velocity of particles in a fluid, have been developed. The computations of the local velocities are obtained by analyzing the local motions of the particles.

The first family of techniques concern the methods based on Laser Doppler Velocimetry (LDV) wherein the fluid volume under test is illuminated by two coherent laser beams. The interference between the two beams creates a pattern with parallel fringes with a spatial frequency that is depending on the angle between the two propagation directions. When a particle is crossing the volume, it travels across the sequence of the light fringes and diffuses light proportionally to the local light intensity. Therefore, the diffused light is modulated by a frequency that is determined by the speed of the particle and the fringe spacing. The diffused light is detected and its frequency is computed in such a way that the speed of the particle is estimated. LDV technique gives an accurate measurement but measures the global velocity in one direction in a local region.

The second family concerns the techniques developed for Particle Intensity Velocimetry (PIV) wherein the volume under test is illuminated with a tin light sheet. This one is perpendicularly observed by a video camera that images the particles illuminated by the light sheet. The velocimetry is computed by analyzing the particle motion in sequences of images. The PIV is a two dimensional method and no information about motions parallel to the optical axis of the camera lens can be measured.

The third family concerns the so-called Photogrammetric methods wherein the illuminated volume under test is observed by several video cameras (2–4) with different viewing directions. The cameras are triggered in such a way that the images are recorded at the same time by the different cameras. The digitized images are processed and each particle is located in the different images. The relative positions of the particles in each image allow computing the three dimensional position of each particle. The three dimensional velocity maps are obtained by analyzing sequences of images. The main drawbacks of this system are:

The limited depth of view available with the classical imaging lenses. This becomes crucial when the volume of interest is small (typically less than 1 cm$^3$).

The angles of viewing directions lead often to hidden parts of the volume of interest.

The fourth family is based on Digital holographic methods. In particular, a digital holographic method has been disclosed by Skarman, Wozniac and Becker, "Simultaneous 3D-PIV and temperature measurement using a new CCD based holographic interferometer", Flow Meas. Instruction., Vol. 7, N°1, pp 1–6, 1996. This technique uses a digital refocus of the particle images. The optical set up is an interferometer. A laser beam (object beam) is transmitted through the volume under test and is imaged by a lens on the input face of a video camera. A second coherent beam is also incident on the input face of the camera. The two beams are interfering in such a way that the amplitude and the phase of the object beam can be computed by digital methods. As only one plane of the volume under test can be imaged, there is an important loss of information. However, the digital refocus allows to reconstruct the images of the particles.

The proposed method presents several drawbacks. First, due to a transmission illumination, only large particles can be considered. In the case of small particles, the disturbances of the optical field that they create are too weak to be measured with accuracy. Second, the computation of the optical phase is performed by the so-called phase stepping method. It requests to record several video frames with small changes of the optical paths introduced in the reference beam. This small changes of the optical paths takes time as the recording of the several video frames. During processing, the particles have to be sufficiently immobile in such a way that the method may only be used for low velocities. The three dimensional velocities are computed by analyzing sequences of images.

The last family concerns holographic methods using holographic recording media which can be thermoplastic films, silver halide films, etc. During the recording step, a hologram sequence of the moving particles is recorded. After processing, (thermal processing for thermoplastic, wet processing for the silver halide films), the holograms are reconstructed by illumination with a laser beam. The hologram is able to record the three dimensional information that can be measured with an imaging system like a video camera placed on a translation stage. Therefore the particle position measurements along the optical axis request mechanical motion of the imaging system.

This system presents several limitations. First, the holographic materials are always of weak sensitivity requesting a long exposure time or a high power laser. Secondly, the system needs a mechanical motion that is a source of positioning errors. Finally, the number of holograms that can be recorded in a sequence is limited. In practice, it is difficult to have more than 250 holograms.

SUMMARY OF THE INVENTION

The present invention aims to provide an improved digital holographic method for measuring the position of particles in a fluid medium, in particular for measuring the velocity of the particles. The method is able to refocus the image of the particles (seeds) moving in the fluid medium without the necessity of having several images being captured to get the complete three dimensional information, i.e., the amplitude and the phase.

More precisely, the present invention relates to a method which can be applied even to the measurement of the velocity of small and very small particles moving in fluid. With appropriate adjustments of the optical systems, the size range of the particles is typically from 500 μm to 0.1 μm.

Finally, the present invention concerns a method, which is able to measure the velocity of the fluid even if the speed of the particles is rather important. An estimation of the speed range of the particles is from 0 m/s to 600 w/s, where w is the size of the particles.

The present invention also relates to a method, which provides for improved speed processing, compared to most of the techniques of the state of the art.

Another aspect of the present invention is to provide an apparatus for performing said method.

Other advantages are described in the following detailed description.

The present invention is related to a method of measuring the three dimensional position of particles, possibly in motion, in a fluid medium contained in a sample by recording a digital hologram of said particles on an image sensor and by reconstructing the image of said particles from said hologram, the recording comprising:

providing a source beam with a coherent source;

generating at least two beams from said source beam, namely a reference beam and at least one object beam, said reference beam and said object beam being mutually coherent;

illuminating said sample by condensing said object beam onto said sample in order to obtain a scattered object beam for each particle;

transforming said scattered object beam into a spherical converging object beam toward said image sensor for each particle;

forming a diverging spherical beam from said reference beam;

superposing said spherical converging object beam for each particle and said diverging spherical beam on said image sensor, thereby obtaining on said image sensor an hologram of said particles by interfering said beams.

Preferably, said object beam is obtained by reflection of the source beam and said reference beam is obtained by transmission of the source beam.

In the case of the measurement of the velocity of a particle, the method further comprises the step of recording the time evolution of said hologram so that a sequence of holograms is obtained and the step of reconstructing a sequence of images from said sequence of holograms in order to determine the velocity of the particles in the fluid medium.

According to a preferred embodiment, the object beam is split into several object beams after being generated so that the illumination of the sample is performed with the object beams thus obtained.

In order to have the reconstruction of the image of the particles contained in the sample, the following acts are performed:

recording a reference hologram on the image sensor in the absence of the illuminating object beam and digitizing said reference hologram;

subtracting said digitized reference hologram to the digitized hologram of the particles which has been recorded in the presence of the illuminating object beam;

demodulating the resulting digitized hologram using the classical Fourier Transform method in order to obtain a Fourier Transform function depicting the three dimensional positions of the particles;

filtering said Fourier Transform function; and calculating an inverse Fourier Transform function from said filtered Fourier Transform function thus obtained.

In order to have the reconstruction of the sequence of images of the particles contained in the sample as a function of time, the following acts are performed:

recording a sequence of reference holograms on the image sensor in the absence of the illuminating object beam and digitizing said sequence of reference holograms;

subtracting said sequence of reference holograms to the sequence of holograms of the particles which has been recorded in the presence of the illuminating object beam and digitized;

demodulating the resulting sequence of holograms using the classical Fourier Transform method in order to obtain a sequence of Fourier Transform functions depicting the evolution of the three dimensional positions of the particles according time;

filtering said sequence of Fourier Transform functions; and calculating a sequence of inverse Fourier Transform functions from said sequence of filtered Fourier Transform functions thus obtained.

A preferred embodiment also relates to an apparatus for measuring the three dimensional position or the velocity of the particles, preferably in motion, in a fluid contained in a sample, wherein the apparatus comprises:

a coherent source able to generate a coherent source beam;

means for generating at least two coherent beams from said source beam, namely a reference beam and at least one object beam;

an image sensor;

means for condensing said object beam onto said sample in order to obtain a scattered object beam;

means for transforming said scattered object beam into a spherical converging object beam for each particle on said image sensor; and means for forming a diverging spherical beam from said reference beam on said image sensor.

According to a preferred embodiment, the means for transforming said scattered object beam into the spherical converging object beam for each particle on said image sensor are consisting in an afocal device essentially comprising a microscope lens and another lens.

Preferably, said afocal device is associated with an aperture whose maximum size, preferably the diameter, is adjustable in order to match the resolution of the afocal device and the resolution of the image sensor.

Advantageously, the coherent source is a laser source and the means for generating the reference beam and at least one object beam are consisting in a first beam splitter placed behind said laser source.

Preferably, the means for condensing said object beam onto said sample in order to obtain a scattered object beam are a condensing lens.

According to another preferred embodiment, the means for condensing said object beam onto said sample in order to obtain a scattered object beam are essentially consisting in the afocal device associated with a polarizing beam splitter which is combined to a wave plate for achieving optical insulation of the object beam. Preferably, there is also a polariser.

Preferably, the means for forming the diverging spherical beam from the reference beam on said image sensor are essentially consisting in a beam splitter.

According to another embodiment, the means for generating the reference beam and at least one object beam are consisting in an optical fiber coupler placed behind said laser source.

Preferably, in this case, the means for condensing the object beam onto said sample in order to obtain a scattered object beam are a monomode optical fiber coupled to the optical fiber coupler.

Preferably, in this case, the means for forming the diverging spherical beam from the reference beam on said image sensor are essentially consisting in a monomode optical fiber coupled to the optical fiber coupler.

Preferably, the apparatus also comprises means for recording and digitizing interference patterns as functions of time and means for treating said digitized interference patterns.

Advantageously, said means for recording and digitizing the interference patterns are classical hologram supports, and more preferably a CCD camera coupled with computing means.

Advantageously, the apparatus also comprises means for splitting the object beam into several object beams able to illuminate the sample.

The study of particle-particle interactions in aerosols, the control of protein crystal growth or the control of the state of samples in space are examples of potential applications of the method according to the invention.

DETAILED DESCRIPTION OF THE PREFERRED EMBODIMENT

Figure 1:
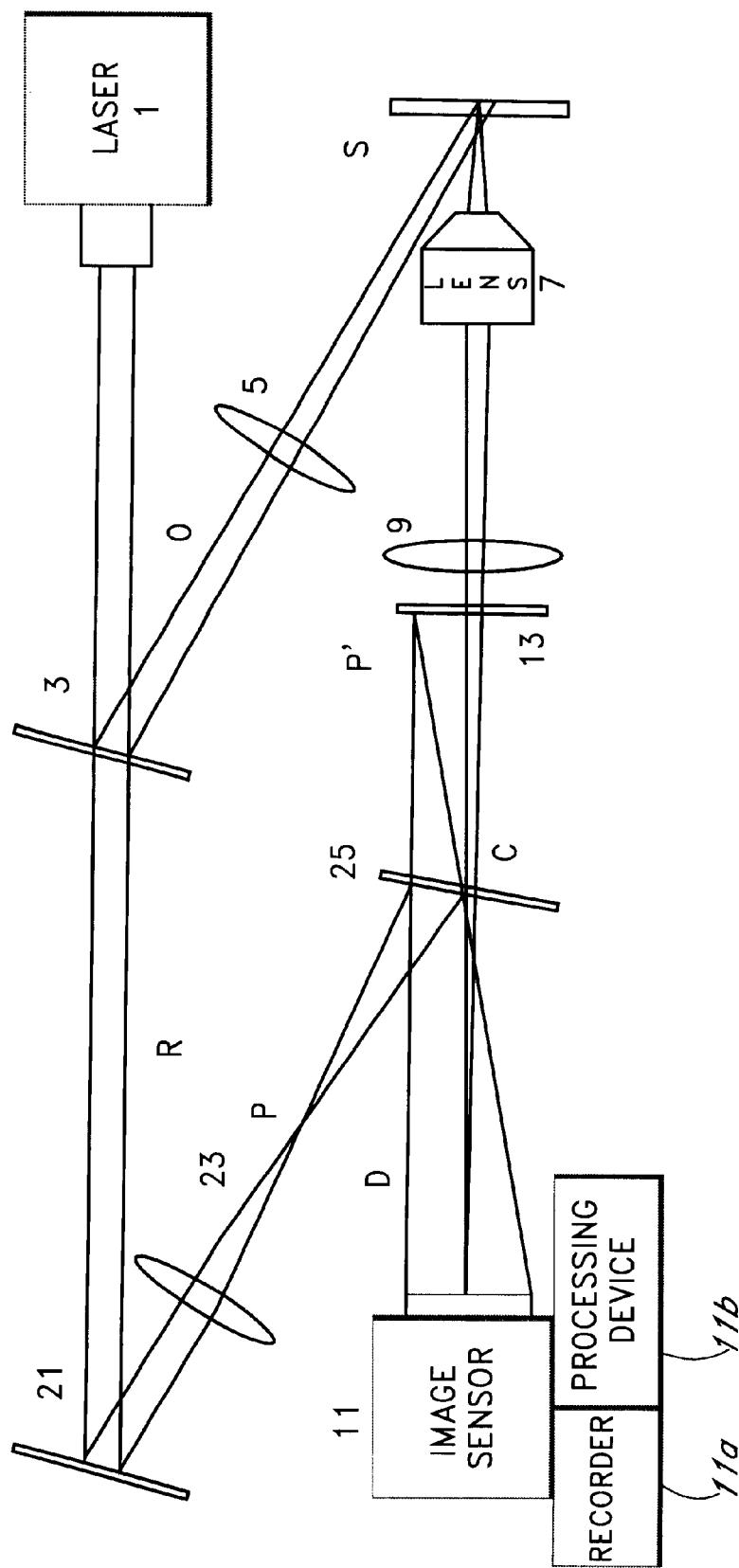
FIG. 1 is a first embodiment of the apparatus used for measuring the velocity of a fluid medium in motion according to the method of the present invention.

The three dimensional particle localization and tracking method of a preferred embodiment results from the suitable combination of optical hardware to record the data and image processing tools to extract the information about the position of the particles in the test volume. FIG. 1 is describes more precisely a device used to implement said method.

In the first embodiment as presented in FIG. 1, a source 1 is an expanded collimated laser beam that is partly reflected by a beam splitter 3. The reflected beam corresponding to the object beam O, is condensed by a converging lens 5 into the volume of the test sample S. The converging lens 5 is placed between the beam splitter 3 and the sample S. The test sample S is constituted by a fluid seeded by particles that are bright on a dark background due to the laser illumination. The illumination level is adjusted by changing the condensation power of the lens 5 by moving it along its optical axis. The apparatus comprises also an afocal device. Said afocal device essentially comprises a microscope lens 7 which is placed just behind the sample S and a lens 9 which is placed behind the microscope lens 7. The afocal device images one plane of the test sample on the input face of an image sensor 11 (video camera, photographic camera, digital camera). It should be noticed that the microscope lens 7 in the afocal device could be replaced by a short focal length lens.

The magnification M of the afocal device is given by the ratio of the focal lengths ($f_7$, $f_9$) of the lens 7 and the lens 9:

$$M = f_9/f_7$$

The system is not restricted to the only microscopic test. Larger test volume can be analyzed by reducing the magnification M.

The proposed system is used to analyze a test sample with a larger depth than the classical depth of focus defined by the lens 7, 9 the aperture and the resolution of the imaging system. In this case, the particles that are in the depth of focus give rise to well focused images while the ones that are out of focus give diffuse and unsharp light distributions on the input face of the image sensor. Note that an aperture 13 is placed just after the lens 9. Its role is to match the resolution of the afocal device with the resolution of the image sensor 11. When the size of aperture 13 is reduced, the width of a perfectly imaged particle is enlarged by diffraction phenomena. By adjusting the size of the aperture 13, the minimum image width can be equal to the dimension of one cell of the image sensor. Advantageously this allows the analysis of phenomena wherein the particles are very small (submicron particles).

In order to retrieve and restore the information of the unfocused particles by the further digital holography step, an additional beam corresponding to the reference beam R is superposed to the previous input beam (object beam) on the image sensor. The reference beam R is originates from the transmitted beam by the beam splitter 3 and is coherent with the object beam O. The reference beam R is first reflected by a mirror 21 and focused by a lens 23 in a pinhole at a point P. Then, this beam is reflected by a second beam splitter 25, which is placed behind the aperture 13 and in front of the image sensor 11, and is incident on the image sensor 11. The object beam O and the reference beam R are interfering on the input face of the image sensor. The reference beam R has several features:

The only optical component between the focused point P by the lens 23 and the image sensor 11 is the beam splitter 25. As available beam splitters can be very flat, no significant optical aberration is introduced by such a component. Therefore, the reference beam incident on the image sensor can be considered as a perfect diverging spherical wave.

The beam splitter 25 modifies the optical path in such a way that the reference beam can be considered as emerging from a virtual point source P' preferably located in the plane of aperture 13, preferably outside of the aperture 13. As the object beam corresponding to one particle can be seen as a spherical converging beam C, the recorded interference patterns are identical in the whole field of view for all particles that have the same defocus distance. This is a crucial point for further image processing. All the defocused particles are processed in the same way regardless to their position in the field of view. The virtual point source P' could be also located in the hole of the aperture 13 but is preferably out of the optical axis. Source P' could be also located upstream and downstream the plane of the aperture 13. The position of the virtual point source P', which is preferably outside of the hole of the aperture 13, allows to alleviate the inherent ambiguities about the increase or decrease of the optical path in interferometry. In the selected configuration, the increase or decrease of the optical path gives rise to a unique fringe pattern. Therefore, the complete information of the optical object field can be unambiguously computed by image analysis. This is the reason why only one image is sufficient to catch all the information about the observed 3D scene.

Several different configurations have been identified:

Multibeam illumination is possible. The same method of the preferred embodiment can be used except that the object beam O is split into several beams. The illumination of the sample can be then achieved from different directions.

Illumination through the microscope lens 7 is another possibility. In the cases where side illumination is not possible, the illumination can be achieved through the microscope lens. In this case, which corresponds to a second preferred embodiment, the use of wave plates to achieve optical insulation of the illumination beam can be implemented.

Illumination using optical fibers to direct the light is also possible and corresponds to a third preferred embodiment.

Figure 2:
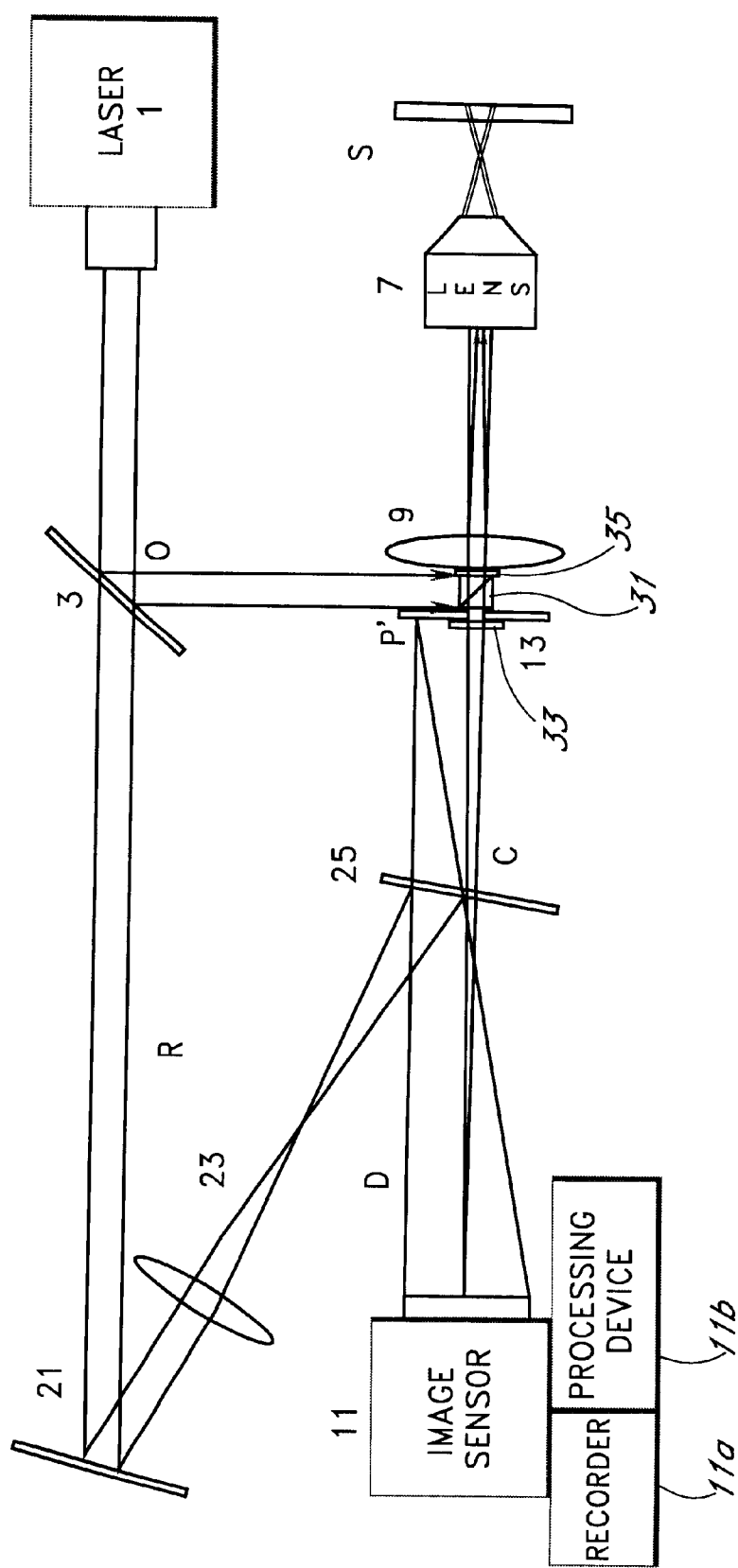
FIG. 2 is a second embodiment of the apparatus used for measuring the velocity of a fluid medium in motion according to the method of the present invention.

In the second embodiment shown in FIG. 2, the illumination is made though the microscope lens 7, and the beam splitter 3 redirects the light towards a polarizing beam splitter 31 which is placed behind the afocal device. The incident polarization of the laser source is adjusted in such a way that the beam is completely reflected to the lens 9 of the afocal device. The beam is made slightly convergent by said lens 9 and is illuminating the sample by way of the microscope lens 7. As the incident beam on the microscope lens 7 is slightly convergent, it is possible to achieve a full illumination of the sample. The light retro-diffused by the sample is incident on the image sensor 11 as in the previous case. A wave plate 35 ($\lambda/4$) in combination with the beam splitter 31 or a polarizer 33 plays the role of optical insulator to avoid retro reflection on the optical surfaces (lenses 7, 9) and windows of the experimental cell toward the image sensor. In this way, only depolarized light retro-diffused by the particles in the sample gives rise to optical signals on the image sensor.

Figure 3:
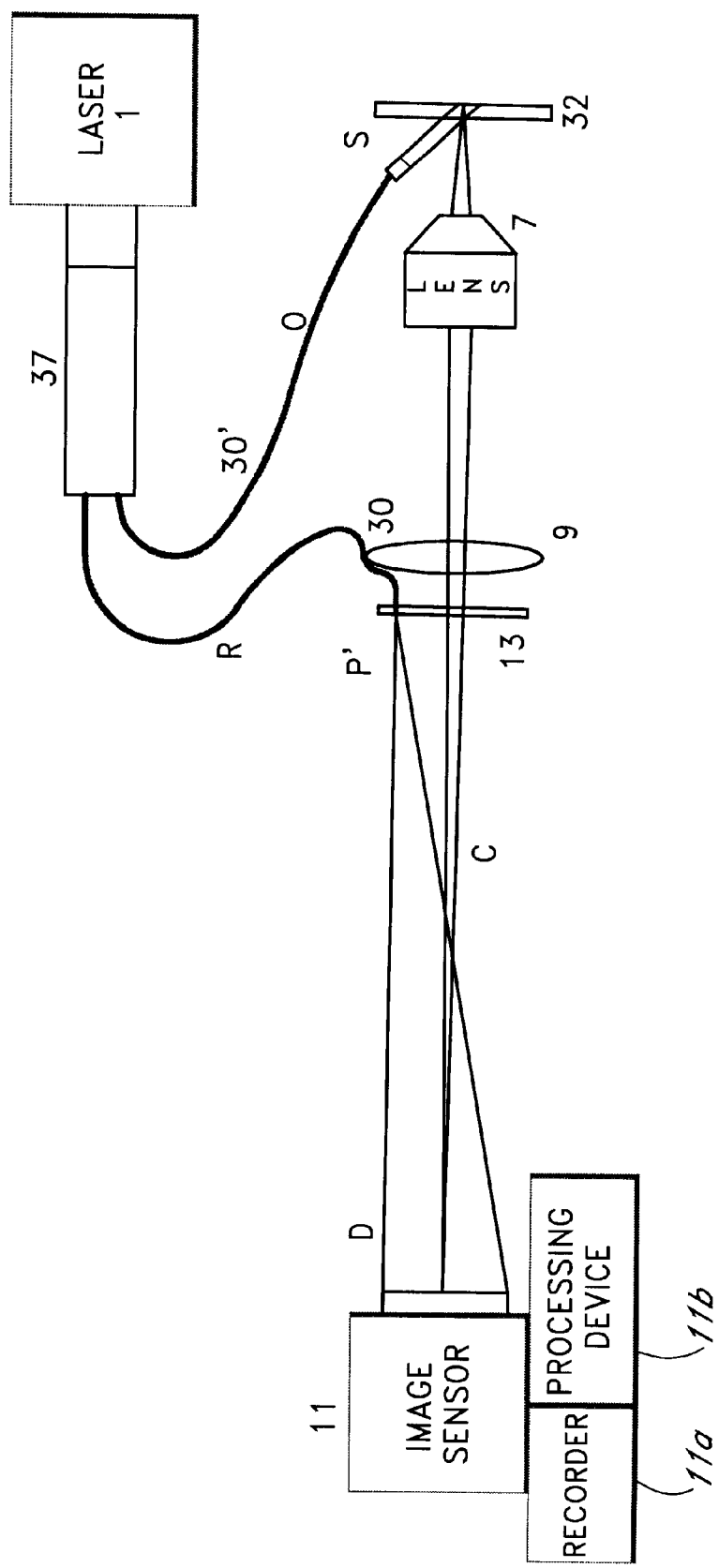
FIG. 3 is a third embodiment of the apparatus used for measuring the velocity of a fluid medium in motion according to the method of the present invention.

In the third embodiment as shown in FIG. 3, the digital holographic microscope is implemented with optical fibers for both illumination of the sample S and the reference beam R. The laser beam 1 is coupled to two or more monomode optical fibers 30, 30' with a fiber coupler 37. In FIG. 3, a device with a first monomode optical fiber 30 and a second monomode optical fiber 30' is depicted. The end of the first optical fiber 30 is directly at the location of the point P' on aperture 13. As the fiber is monomode, the reference beam R is a perfectly diverging beam on the image sensor 11.

The ends of the second optical fiber 30' are used to illuminate the sample S with an object beam O. That can be achieved both in reflection and in transmission. In order to keep a high illumination level of the sample, the ends of the illumination fibers are provided with a GRIN lens 32 that reduces the beam divergence and can be even used to condense the light. The afocal device with a microscope lens 7 and a lens 9, the pinhole 13 and the image sensor 11 are comparable to the ones used in the embodiments already disclosed.

As indicated hereabove, the overall system results from the appropriate combination of the optical set up and of the following image processing.

The images are picked up by the image sensor and are digitized for further processing. In order to improve the performance, it is necessary to calibrate the system before to start the experiment itself. This is achieved by recording an image of the reference beam alone (object beam closed). This image will be called hereinafter $x_{ref}(s,t)$, where s, t are integers denoting the position in the digitized image.

The processing can be summarized as follows:
Subtraction of the calibration image, and
Computation of the optical field The first step can be summarized as follows. Considering a sequence of digitized images including the object (with particles moving in the field of view) and the reference beams. Those images are named $x_k(s,t)$, where the integers s, t denote also the sample position in the image and k is the image number in the sequence. In order to reduce the influence of the background introduced by the presence of the reference beam everywhere, it is subtracted from all the images of the sequences:

$$x'_k(s,t)=x_k(s,t)-x_{ref}(s,t)$$

The second step can be summarised as follows. As described in the optical set up, the reference beam is a diverging spherical wave originated from the point source P' that is outside of the aperture 13 from where is arriving the object beam. That means that the interference pattern is modulated by a carrier. The goal is to demodulate the interference pattern in order to get the true optical signal of the object. This method is called the carrier method or Fourier transform method.

Considering that the point source P' is separated from the center of the aperture 13 along the s direction. Each line of the images $X'_k(s,t)$ is Fourier transformed by FFT along the s direction:

$$X'_k(U,t) = \frac{1}{\sqrt{N}}\sum_{s=0}^{N-1}\exp\left\{-2\pi i \frac{Us}{N}\right\}x'_k(s,t),$$

where:
N is number of samples by lines,
U is the spatial frequency associated to s,
i is the imaginary number ($i^2=-1$).

The demodulation is achieved by shifting the Fourier transformed image in the U direction by the amount $\Delta U$ given by:

$$\Delta U = \frac{\delta\phi}{\lambda f}N$$

where:
$\delta$ is the sampling distance,
$\lambda$ is the wavelength
f is the focal length of lens 9,
$\Phi$ is the distance between the center of the aperture 13 and the point source P'.
By the shift, one obtains:

$$X''_k(U,t)=X'_k(U-\Delta U,t)$$

This function is filtered (multiplied) by a Gauss function along the U direction to limit the higher spatial frequencies.

$$X'''_k(U,t) = X''_k(U,t)\exp\left\{-\frac{U^2}{2L^2}\right\}$$

Where: $-\frac{N}{2} \leq U \leq \frac{N}{2}-1$

L is a parameter to be adjusted that define the width of the Gauss function.

The inverse Fourier Transformation of $X'''_k(U,t)$ gives rise to $x'''_k(s,t)$ that is the complex amplitude to be directly injected in the digital holography algorithm.

The distinctive and advantageous peculiarity of the digital holography is associated with the fact that it does not require photo films, their development, etc. All the information is stored by means of the video camera on the videotape recorder 11a or directly in the memory of a PC as a processing device 11b. The image processing programs which have been developed make it possible to work with the obtained numerical data as if one tunes a dial of a virtual microscope.

The refocusing capability of an optical field by digital holography is based on the fact that a complete knowledge of its complex amplitude in a plane allows determining the complex amplitude in parallel planes separated by various distances. This results directly from the usual propagation law of optics.

Complete knowledge of the optical field means that the amplitudes and phases are measured in the recording plane.

This measurement is achieved by using the interferometric set-up described hereabove. By measuring the phase and the amplitude of an optical field, we can compute its propagation or its back propagation on successive planes. In this way, defocused optical fields can be reconstructed up to the best focus plane. It must be emphasized that this technique is a true optical field reconstruction technique (by digital means) and not an image processing method that recreates the sharpness of the image.

An experimental volume is reconstructed slice by slice in order to achieve a full focused volume. A particular three dimensional area of the reconstructed image may be analyzed digitally, easily changing magnification and the area of interest. Advantageous is that the whole three dimensional-information about the visualized object is recorded in a short delay time. It considerably reduces the time distortion typical for mechanical scanning systems. Another advantage of this technique is the use of only two images—one for the reference and one for the object which, nevertheless, enable complete three dimensional reconstruction. It reduces many times the amount of information to be stored that is highly recommended, for example, in the space environment.

In order to achieve three dimensional velocimetry, the concept includes reconstructing slice by slice a three dimensional field of particles. The three dimensional position of each particle is measured by the XY position of the particle on the CCD camera and the best focus position along the optical axis estimated by the digital holographic system. Velocimetry results from the analysis of a sequence of the three dimensional particle images with image processing techniques.

Up to now, the use of three dimensional velocimetry has been tested with transmission mode for the illumination of the samples (illumination through the samples). However, in the case of the very small particles (for example: 0.1 $\mu$m–10 $\mu$m), transmission illumination is not convenient because the perturbation of the optical field introduced by such small particles is very weak to be measured with accuracy. Therefore, it is better to work in reflection mode. In this case even a very small particle will give an optical retro-diffused signal on a dark background that can be measured. When the particle size is smaller than the resolution limit, an optical spread function is obtained that can be refocused up to the optical limit of the system. The important point is that the digital holographic system is valid to estimate the best position of the particle along the optical axis, thus obtaining the third co-ordinate.

What is claimed is:

1. A method of measuring a three dimensional position of particles in a fluid medium contained in a sample, comprising:

providing a sample containing a fluid medium with movable particles for measuring a three dimensional position of said particles in said fluid medium;

recording a digital hologram of said particles on an image sensor, the recording comprising:

providing a source beam from a coherent source;

generating at least two beams from said source beam, namely a reference beam and at least one object beam, said reference beam and said object beam being mutually coherent;

illuminating said sample by condensing said object beam onto said sample in order to obtain a scattered object beam for each particle;

transforming said scattered object beam into a spherical converging object beam toward said image sensor for each particle;

forming a diverging spherical beam from said reference beam; and superposing said spherical converging object beam for each particle and said diverging spherical beam on said image sensor, thereby obtaining on said image sensor an hologram of said particles by interfering said beams;

reconstructing an image of said particles from said digital hologram; and digitally analyzing said reconstructed image so as to measure the three dimensional position of said particles.

2. The method of claim 1, further comprising recording a time evolution of said hologram so that a sequence of holograms is obtained, and reconstructing a sequence of images from said sequence of holograms in order to determine a velocity of the particles in the fluid medium.

3. The method of claim 1, wherein the object beam is split into several object beams after being generated so that the illumination of the sample is performed with the object beams thus obtained.

4. The method of claim 1, wherein the reconstruction of the image of the particles contained in the sample comprises:

recording on the image sensor a reference hologram in the absence of the object beam and digitizing said reference hologram;

subtracting said reference hologram from the hologram of the particles which has been recorded in the presence of the object beam and digitized;

demodulating a resulting hologram using the classical Fourier Transform method in order to obtain a Fourier Transform function depicting the three dimensional positions of the particles;

filtering said Fourier Transform function; and calculating an inverse Fourier Transform function from said filtered Fourier Transform function.

5. The method of claim 2, wherein the reconstruction of the sequence of image of the particles contained in the sample comprises:

recording on the image sensor a sequence of reference holograms in the absence of the object beam and digitizing said sequence of reference holograms;

subtracting said sequence of reference holograms from the sequence of holograms of the particles which has been recorded in the presence of the object beam and digitized;

demodulating a resulting sequence of holograms using the classical Fourier Transform method in order to obtain a sequence of Fourier Transform functions depicting the evolution of the three dimensional positions of the particles as a function of time;

filtering said sequence of Fourier Transform functions; and calculating a sequence of inverse Fourier Transform functions from said sequence of filtered Fourier Transform functions thus obtained.

6. An apparatus for measuring a three dimensional position or a velocity of particles in a fluid contained in a sample, comprising:

a coherent source configured to generate a coherent source beam;

a first beam splitter configured to generate at least two beams from said source beam, namely a reference beam and at least one object beam;

a condensor configured to condense said object beam onto a sample in order to obtain a scattered object beam, said sample containing a fluid medium with movable particles for measuring a three dimensional position of said particles in said fluid medium;

a transformer configured to transform said scattered object beam into a spherical converging object beam for each particle;

a diverter configured to form a diverging spherical reference beam from said reference beam;

a digital image sensor positioned to receive said diverging spherical reference beam and said spherical converging object beam, wherein said coherent source, said first beam splitter, said digital image sensor, said condensor, said transformer and said diverter are arranged to generate an interference pattern on said image sensor of the diverging spherical reference beam and the spherical converging object beam;

a recorder configured to record and digitize said interference pattern; and a processing device configured to process said digitized interference pattern so as to determine the three dimensional position or the velocity of the particles.

7. The apparatus of claim 6, wherein the transformer is an afocal device comprising a microscope lens and a lens.

8. The apparatus of claim 7, wherein the afocal device is associated with an aperture whose maximum size and diameter are adjustable in order to match a resolution of the afocal device and a resolution of the image sensor.

9. The apparatus of claim 6, wherein the coherent source is a laser source, and wherein the beam splitter is positioned behind said laser source.

10. The apparatus of claim 6, wherein the condenser comprises a condensing lens.

11. The apparatus of claim 7, wherein the condenser comprises the afocal device associated with a polarizing beam splitter which is combined to a wave plate for achieving optical insulation of the object beam.

12. The apparatus of claim 6, wherein the diverter comprises a second beam splitter.

13. The apparatus of claim 12, wherein the coherent source is a laser source, and wherein the second beam splitter is an optical fiber coupler placed behind said laser source.

14. The apparatus of claim 13, wherein the condenser is a monomode optical fiber coupled to the optical fiber coupler.

15. The apparatus of claim 13, wherein the diverter essentially comprises a monomode optical fiber coupled to the optical fiber coupler.

16. The apparatus of claim 6, wherein the digital image sensor and the recorder are comprised in a CCD camera.

17. The apparatus of claim 6, further comprising a third beam splitter configured to split the object beam into several object beams able to illuminate the sample.

* * * * *